US010000714B2

(12) United States Patent
Irving et al.

(10) Patent No.: US 10,000,714 B2
(45) Date of Patent: Jun. 19, 2018

(54) IRON OXIDE NANOPARTICLE DISPERSIONS AND FUEL ADDITIVES FOR SOOT COMBUSTION

(71) Applicant: Cerion Enterprises, LLC, Rochester, NY (US)

(72) Inventors: Lyn Marie Irving, Rochester, NY (US); David Wallace Sandford, Rochester, NY (US); Albert Gary DiFrancesco, Rochester, NY (US); Richard Kenneth Hailstone, North Chili, NY (US)

(73) Assignee: CERION LLC, Rochester, NY (US)

( * ) Notice: Subject to any disclaimer, the term of this patent is extended or adjusted under 35 U.S.C. 154(b) by 0 days. days.

(21) Appl. No.: 13/902,156

(22) Filed: May 24, 2013

(65) Prior Publication Data

US 2013/0337998 A1    Dec. 19, 2013

Related U.S. Application Data

(60) Provisional application No. 61/688,982, filed on May 25, 2012.

(51) Int. Cl.
*C10L 10/06*     (2006.01)
*B01J 13/00*     (2006.01)
(Continued)

(52) U.S. Cl.
CPC ............ *C10L 10/06* (2013.01); *B01J 13/003* (2013.01); *B01J 13/0017* (2013.01);
(Continued)

(58) Field of Classification Search
None
See application file for complete search history.

(56) References Cited

U.S. PATENT DOCUMENTS 6,271,269 B1 *   8/2001   Chane-Ching et al. ........ 516/33
7,459,484 B2    12/2008   Blanchard et al.
(Continued)

FOREIGN PATENT DOCUMENTS

JP    1987038236 A    2/1987
JP    2006242597 A    9/2006
(Continued)

OTHER PUBLICATIONS https://en.wikipedia.org./wiki/Dispersion.*
(Continued)

*Primary Examiner* — Yun Qian
(74) *Attorney, Agent, or Firm* — RatnerPrestia

(57) ABSTRACT

Aqueous and substantially crystalline iron oxide nanoparticle dispersions and processes for making them are disclosed. The nanoparticle size and size distribution width are advantageous for use in a fuel additive for catalytic reduction of soot combustion in diesel particulate filters. Nanoparticles of the aqueous colloid are transferred to a substantially non-polar liquid comprising a carboxylic acid and one or more low-polarity solvents. The transfer is achieved by mixing the aqueous and substantially non-polar materials, forming an emulsion, followed by a phase separation into a substantially metal-free remnant polar phase and a substantially non-polar organic colloid phase. A method for rapid and substantially complete transfer of non-agglomerated nanoparticles to the low polarity phase in the presence of an organic amine, and a rapid phase separation of the substantially non-polar colloid from a remnant aqueous phase, are provided.

8 Claims, 6 Drawing Sheets

(51) Int. Cl.
*C01G 49/02* (2006.01)
*C10L 1/10* (2006.01)
*C10L 1/12* (2006.01)
*C10L 10/02* (2006.01)
*B82Y 30/00* (2011.01)
*C10L 1/16* (2006.01)
*C10L 1/188* (2006.01)
*C10L 1/222* (2006.01)

(52) U.S. Cl.
CPC ........... *B01J 13/0047* (2013.01); *B82Y 30/00* (2013.01); *C01G 49/02* (2013.01); *C10L 1/10* (2013.01); *C10L 1/1233* (2013.01); *C10L 10/02* (2013.01); *C01P 2002/72* (2013.01); *C01P 2004/04* (2013.01); *C01P 2004/64* (2013.01); *C10L 1/1616* (2013.01); *C10L 1/1881* (2013.01); *C10L 1/2222* (2013.01); *C10L 2200/024* (2013.01); *C10L 2270/026* (2013.01)

(56) References Cited

U.S. PATENT DOCUMENTS

| | | |
|---|---|---|
| 9,127,168 B2 | 9/2015 | Hakata et al. |
| 2006/0194887 A1 | 8/2006 | Kojima et al. |
| 2007/0098990 A1 | 5/2007 | Cook et al. |
| 2008/0207934 A1* | 8/2008 | Kim et al. .............. 554/74 |
| 2009/0108229 A1 | 4/2009 | Silverman et al. |
| 2010/0152077 A1* | 6/2010 | Allston et al. ............ 508/165 |
| 2010/0242342 A1 | 9/2010 | Reed et al. |

FOREIGN PATENT DOCUMENTS

| | | |
|---|---|---|
| JP | 2010522782 A | 7/2010 |
| WO | 2008116550 A1 | 10/2008 |
| WO | 2011062217 A1 | 5/2011 |

OTHER PUBLICATIONS

Presentation by Sung Je Lee.*
Wayback Machine/Internet Archives.*
International Search Report and Written Opinion for PCT/US2013/042642, European Patent Office, dated July 18, 2013.
A.B. Bourlinos; A. Bakandritsos; V. Georgakilas; V. Tzitzios; and D. Petridis; Facile Systhensis of Capped Y—FeXO3 and Fe3O4 Nanoparticles, Journal of Materials Science, Kluwer Academic Publishers, Vo. 41, No. 16 May 27, 2006.
Second Examination Report dated Aug. 1, 2016 for Australian Application No. 2013266152, 3 pages.
Notice of Reasons for Rejection for Japanese Application No. 2015-514218, dated Dec. 26, 2017, including English translation, 9 pages.
Australian Examination Report for Australian Application No. 2013266152, dated Dec. 4, 2015.
Notice of Reasons for Rejection for Japanese Application No. 2015-514218, dated Apr. 28, 2017, including English translation, 9 pages.
European Communication for European Application No. 13 727 759.6, dated Jul. 21, 2017, 6 pages.
European Communication for European Application No. 13 727 759.6, dated Mar. 28, 2018, 4 pages.

* cited by examiner

IRON OXIDE NANOPARTICLE DISPERSIONS AND FUEL ADDITIVES FOR SOOT COMBUSTION

CROSS-REFERENCE TO RELATED APPLICATIONS

This patent application claims the benefit of priority to U.S. Provisional Patent Application Ser. No. 61/688,982, IRON OXIDE NANOPARTICLE DISPERSIONS AND FUEL ADDITIVES FOR SOOT COMBUSTION, filed May 25, 2012, the disclosure of which is incorporated herein by reference in its entirety.

FIELD OF THE INVENTION

The present invention relates generally to colloidal nanoparticle dispersions and more specifically to improved processes for the manufacture of iron oxide containing colloidal dispersions in aqueous systems and in solvents having low polarity. In another aspect the invention relates to fuel additives for the catalytic combustion of soot.

BACKGROUND OF THE INVENTION

Iron oxide nanoparticles have many current industrial uses, along with many emerging technical applications. They are well known as important components, for example, in magnetic storage devices, in heterogeneous and homogeneous catalysis, in sensors, and in magnetic resonance imaging (MRI) for medical diagnosis and therapeutics. The use of fuel-borne iron oxide nanoparticles to achieve a reduced combustion temperature of carbonaceous soot in a diesel particulate filter (DPF), thereby assisting in filter regeneration, is an important catalytic application of iron oxide nanoparticles. Build-up of carbonaceous material in diesel particulate filters results in increased exhaust system back pressure. The increased back pressure in turn causes reduced engine efficiency and higher fuel consumption. Reduced build-up of carbonaceous material would reduce the frequency at which filter regeneration is required, thereby reducing maintenance costs.

There are many synthetic processes for the production of metal oxides, including aqueous and hydrothermal precipitation, spray precipitation, combustion, plasma deposition and electrochemical techniques, among others. While water may be utilized as a solvent in each of these synthetic processes, aqueous reaction chemistries are particularly favored in manufacturing processes where high material through-put is desired. However, conventional aqueous processes—precipitation in particular—are often costly as they may involve multiple subsequent steps that are time and energy consuming, as well as equipment intensive.

Conventional large-scale metal oxide manufacturing processes can typically be divided into three stages: aqueous precipitation of precursor compounds, calcination to promote chemical reaction and to enhance crystallinity, followed by final particle size adjustment. In more detail, aqueous precipitation includes the initial steps of reactant dispersal, reactant delivery, particle precipitation, isolation, washing, drying, and optional impregnation with other metal ions; calcination involves heating to 400-1000° C. for several hours; followed by grinding, milling or classification to adjust the final particle size, among others steps.

One approach to reduce the number of steps in an aqueous process is to employ methods that produce a stable aqueous dispersion (suspension, sol) of the final particles directly from the initial reactants, thereby avoiding the time, cost and potential contamination inherent in the particle precipitation, isolation, and drying steps. Moreover, if the particles produced in such a direct method are sufficiently pure, wherein the chemical composition of the particles is as desired, and the particles are sufficiently crystalline, then the calcination step may also be eliminated. In addition, if the particle size and size distribution produced by such a direct method are substantially as desired, then the grinding, milling and classification steps may also be eliminated.

Direct methods to produce aqueous dispersions (suspensions) of crystalline cerium-containing oxide nanoparticles without the use of precipitation, isolation, drying, calcination, grinding, milling or classification steps, and the like, are described in commonly assigned U.S. Patent Application Publication 2010/0242342 A1, CERIUM-CONTAINING NANOPARTICLES, filed May 13, 2010, by K. J. Reed et al., wherein stable aqueous dispersions of crystalline cerium and iron containing oxide nanoparticles in a size range, for example, of 1-5 nanometers are described. However, as disclosed in comparative Example 8 and comparative Example 15 of the US 2010/0242342 reference, application of those methods to the production of iron-only oxide nanoparticles (no cerium), fails to produce stable dispersions of nanoparticles, rather unstable mixtures of particles on the order of about 200 nanometers to about 800 nanometers that form a sediment are produced.

While substantial progress has been made in eliminating manufacturing steps from the synthetic process by which stable aqueous dispersions of metal oxide nanoparticles are prepared, the use of iron oxide nanoparticles in applications such as fuel-borne combustion catalysts for the purpose of, for example, improving efficiency in the combustion chamber and for reducing the ignition (light-off) temperature for soot in the diesel particulate filter, requires that dispersions of these nanoparticles also exhibit stability in the fuel, such that the nanoparticles remain suspended and do not settle out. Thus these nanoparticles, although readily formed and suspended in a highly polar aqueous phase, must then be transferred to a substantially non-polar phase, a process known as solvent shifting. This problem is conventionally addressed by the use of particle stabilizers. However, most particle stabilizers used to prevent particle agglomeration in an aqueous environment are ill-suited to the task of stabilization in a non-polar environment. When placed in a non-polar solvent, such particles tend to immediately agglomerate and, consequently, lose some, if not all, of their desirable particulate properties. Changing stabilizers can involve a difficult displacement reaction or separate, tedious isolation and re-dispersal methods such as, for example, precipitation and subsequent re-dispersal with a new stabilizer using, for instance, a ball milling process, which can take several days and tends to produce polydisperse size frequency distributions.

One approach to simplifying the solvent shifting process employs diafiltration methods and glycol ether solvents of a polarity intermediate between that of water and those of non-polar hydrocarbons, which are used to reduce the polarity of metal oxide nanoparticle dispersions, as disclosed in commonly assigned U.S. Patent Application Publication 2010/0152077, PROCESS FOR SOLVENT SHIFTING A NANOPARTICLE DISPERSION, filed Aug. 28, 2009. Diafiltration, sometimes referred to as cross-flow microfiltration, is a tangential flow filtration method that employs a bulk solvent flow tangential to a semi-permeable membrane. However, drawbacks of these diafiltration methods include the following: relatively slow filtration rates (i.e. time consuming), substantial financial investment in equipment (e.g. pumps and microfilters), and production of a relatively large amount (e.g. several turnover volumes) of waste solvent.

Direct extraction of iron oxide nanoparticles from an aqueous dispersion into a less polar or non-polar phase containing an amphiphilic material and, optionally, a promoter agent to accelerate the rate of transfer of oxide nanoparticles from the aqueous phase into the less polar or non-polar phase, is known in the art. For example, U.S. Pat. No. 7,459,484 to Blanchard et al. discloses that the organic phase contain, in addition to an amphiphilic agent, an alcohol, more particularly a linear or branched aliphatic alcohol having 6 to 12 carbon atoms, such as 2-ethylhexanol, decanol, dodecanol and mixtures thereof, to promote particle transfer, and to improve stability of the organic colloid so formed. However, this reference fails to exemplify the use of a promoter agent, and merely describes (Example 1) a re-dispersal of amorphous particles into a solution of isostearic acid (amphiphilic agent) and ISOPAR® L (organic phase) that employed a heat treatment at 90° C. for 5½ hours. In addition, this reference teaches that it is preferable to operate the extraction at a temperature that is in the range from 60° C. to 150° C., advantageously between 80° C. and 140° C. Thus this reference discloses some of the limitations of the prior art processes, more particularly that these extractions preferably rely upon relatively high temperatures and long process times.

Thus, to date, some progress has been achieved in reducing the cost of producing and solvent shifting aqueous dispersions of iron-containing oxide nanoparticles. However, further improvements in manufacturing efficiency are desired, particularly in the case of iron oxide nanoparticle dispersions used as fuel-borne combustion catalysts or as soot combustion catalysts that require dispersion stability in either a non-polar solvent carrier or in the fuel. At the same time there is a need for stable non-polar iron oxide nanoparticle dispersions having very small average particle size and narrow size distributions, as those are expected to have the highest activity in aiding soot combustion in diesel particulate filters. It would also be very desirable to transfer oxide nanoparticles directly from the aqueous reaction mixture in which the nanoparticles are formed, to a substantially non-polar phase, at low temperatures, to reduce manufacturing hazards in dealing with combustible liquids. It is also advantageous to reduce the total process time necessary for the transfer of oxide nanoparticles from the aqueous to the final substantially non-polar phase, without the use of intermediate polarity solvents, such as glycol ethers. At the same time it is important that nanoparticle colloidal dispersions to be used as fuel additives exhibit excellent colloidal stability and good fluid flow (pour) properties at low ambient temperatures.

SUMMARY OF THE INVENTION

It is an object of the invention to provide a process for producing aqueous iron-containing nanoparticle dispersions, comprising:
(a) forming an aqueous reaction mixture comprising:
  i) a source of iron ions;
  ii) a source of hydroxide ion; and
  iii) at least one carboxylic acid, wherein the molar ratio of the carboxylic acid to iron ions is greater than about 1.5;
(b) heating or cooling the reaction mixture to a temperature in the range of about 0° C. to about 100° C.,
thereby directly forming in the reaction mixture an aqueous dispersion of crystalline iron-containing nanoparticles.

In accordance with a second object of the current invention, a process for preparing an iron-containing nanoparticle dispersion, comprises: (a) forming an aqueous dispersion of iron-containing nanoparticles; (b) adding an immiscible carboxylic acid and, optionally a substantially non-polar solvent; (c) mixing the liquid mixture of step (b) to form an emulsion; (d) allowing the immiscible substantially non-polar phase to separate from a remnant aqueous phase; and, (e) collecting the separated substantially non-polar phase comprising a dispersion of iron-containing nanoparticles.

It is a further object of the invention to provide an iron-containing nanoparticulate fuel additive capable of reducing carbonaceous soot light-off temperature to about 200° C. In particular embodiments, an iron-containing nanoparticulate fuel additive is capable of reducing total hydrocarbon emissions and particular matter in a diesel engine exhaust stream.

The fuel additive produced by the inventive process is characterized as having reduced contamination from ionic constituents, aqueous stabilizer material, and free water, wherein such components originate in the aqueous colloid reaction mixture.

BRIEF DESCRIPTION OF THE DRAWINGS

FIG. 1 is a Transmission Electron Micrograph (TEM) of an iron-containing particle prepared by the comparative process described in Example 1a.

FIG. 2 is an electron diffraction pattern of the particles prepared by the comparative process described in Example 1a.

DETAILED DESCRIPTION OF THE INVENTION

Figure 1:
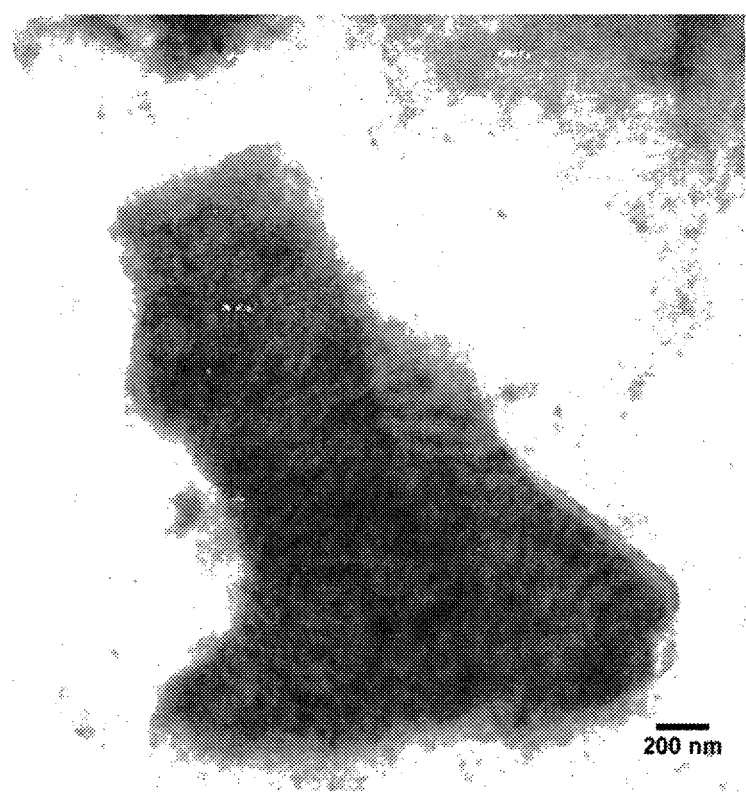

Nanoparticles are particles generally considered to be characterized as having a mean diameter of less than about 100 nanometers (nm). The size of the resulting iron-containing oxide particles can be determined by dynamic light scattering (DLS), a measurement technique for determining the hydrodynamic diameter of the particles. The hydrodynamic diameter is typically slightly larger than the geometric diameter of the particle because it includes both the native particle size and the solvation shell surrounding the particle. Geometric nanoparticle size can be measured by X-ray Diffraction (XRD) by measuring the diffraction peak linewidths and using the Scherrer formula. For substantially monodisperse nanoparticle size distributions having geometric size in the 1-10 nm range, XRD can also reveal a low angle scattering peak that is a direct measure of size of the scattering center. In a particular embodiment of the invention, iron oxide nanoparticles have a mean diameter of about 2.8 nm as measured by low angle X-ray scattering. Alternatively, the geometric diameter of a nanoparticle may be determined by analysis of transmission electron micrographs.

Although nominally described as "iron oxide", it is generally understood by one skilled in the chemical arts, that the actual oxidic anions present may comprise oxide anions or hydroxide anions, or mixtures thereof, such as hydrated oxide phases (e.g. oxyhydroxides). There are at least 16 recognized forms of iron oxide taken in this broad sense. In the context of the present invention, the term iron oxide (for the undoped embodiments) is meant to include compounds of iron and oxygen only, or of iron, oxygen, hydrogen and water of crystallization. In general, for oxide phases comprised of metal cations of multiple oxidation states, it is understood that the total amount of oxidic anions present will be determined by the specific amounts of the various oxidation states of the metal cations present (e.g. $Fe^{2+}$ and $Fe^{3+}$), such that charge neutrality is maintained. Some of the iron oxide phases that can be formed as a result of the inventive processes disclosed herein include, for example, FeO (Wustite), $Fe_3O_4$ (Magnetite), alpha-$Fe_2O_3$ (Hematite), gamma-$Fe_2O_3$ (Maghemite) and various hydrous ferric oxyhydroxides, such as two-line ferrihydrite ($Fe_2O_3$-$0.5H_2O$) and six-line ferrihydrite (nominally $5Fe_2O_3$-$9H_2O$), alpha-FeO(OH) (Goethite) and delta-FeO(OH).

The term "doped" particle refers to a particle containing one or more foreign or dopant ions present in concentrations greater than would normally be present as impurities. In various embodiments, the dopant is an alkali metal ion, alkaline earth metal ion, transition metal ion or a rare earth metal ion. Combinations of dopant metals are also considered. Doping of iron oxide may be desirable to enhance soot combustion catalytic activity, to reduce soot production by enhancing combustion chamber fuel efficiency, to reduce nitrous oxide emissions, and the like. Some alternative terms commonly used in place of "doped" are "substituted", "binary metal", "ternary metal" or "mixed metal."

The term "homogeneously doped iron oxide" nanoparticle refers to a nanoparticle prepared by a process wherein the sources of the dopant metal ions and iron ions are introduced concurrently into the reaction mixture. The sources of the various metal ions may, for example, be co-mixed into the same metal salt solution, or one or more of the various metals may be dissolved in separate solutions and then added simultaneously with the addition of the other metal ions to the reaction mixture, for example, through separate jets. Some alternative terms commonly used in place of "homogeneously doped" are "continuously doped", "uniformly doped," and "unstructured doped."

In this application, the term "transition metal" is understood to encompass the 38 chemical elements of atomic number 21 to 30, 39 to 48, 72 to 80, 104 to 112, which are included in Periods 4, 5, 6, 7, respectively, of the Periodic Table.

In this application, the term "lanthanide metal" is understood to encompass the 15 chemical elements of atomic number 57 to 71, which are included in Period 6 of the Periodic Table.

In this application, the term "actinide metal" is understood to encompass the 15 chemical elements of atomic number 89 to 103, which are included in Period 7 of the Periodic Table.

In this application, the term "rare earth metal" is understood to encompass the 30 chemical elements that comprise the lanthanide metals and the actinide metals.

In this application, the term "crystalline" is understood to describe a material that displays at least one X-ray diffraction peak (excluding low angle XRD peaks), wherein the peak intensity is discernibly greater than the background scattering (baseline noise). The terms "semi-crystalline" or "partially crystalline" are understood to describe a material that displays only broad X-ray diffraction peaks of low peak intensity due to a lack of long-range order. The term "amorphous" is understood to describe a material that does not display any X-ray diffraction peaks (excluding low angle XRD peaks).

In this application, the term "immiscible carboxylic acid" is understood to describe any carboxylic acid for which a mixture thereof with water will separate into two layers. Furthermore, it is understood that herein this term encompasses both completely immiscible carboxylic acids, wherein a mixture of equal volumes of the carboxylic acid and water separates into layers of equal volume, such that none of the carboxylic acid is dissolved in the aqueous phase, and partially immiscible carboxylic acids, wherein a mixture of equal volumes of the carboxylic acid and water separates into layers of unequal volume, such that some of the carboxylic acid is dissolved in the aqueous phase. Examples of immiscible carboxylic acids include, in part, linear and branched alkyl carboxylic acids comprised of about 6 or more carbon atoms, as well as substituted, unsaturated and aromatic analogs thereof.

In accordance with a first aspect of the invention, a method of producing iron-containing nanoparticles in an aqueous dispersion comprises: (a) forming an aqueous reaction mixture comprising: i) a source of iron ions; ii) a source of hydroxide ion; and iii) at least one carboxylic acid, wherein the molar ratio of the carboxylic acid to iron ions is greater than about 1.5; (b) heating or cooling the reaction mixture to a temperature in the range of about 0° C. to about 100° C., thereby directly forming in the reaction mixture an aqueous dispersion of crystalline iron-containing nanoparticles.

In particular embodiments of the invention, the various reactants comprising the reaction mixture are introduced into the reaction mixture as a separate addition or additions (i.e. alone), as part of a series of sequential reagent additions. This manner of reactant addition is alternatively termed single jet or single feed stream addition.

In other particular embodiments, wherein the source of iron ions and the source of hydroxide ions are added separately (i.e. single jet addition), the molar ratio of the carboxylic acid to iron ions is greater than about 1.8, greater than about 2.4, greater than about 3.0, or greater than about 3.9.

In other embodiments, the various reactants comprising the reaction mixture are introduced into the reaction mixture along with one or more of the other reactants (i.e. concurrently), either by mixing the reactants together or introducing them into the reaction mixture at least in part at the same time (i.e. simultaneously). This manner of reactant addition is alternatively termed multiple (e.g. double) jet addition or multiple (e.g. double) feed stream addition.

In accordance with a particular embodiment of the first aspect of the invention, a method of producing iron-containing nanoparticles in an aqueous dispersion comprises: (a) forming an aqueous reaction mixture comprising: i) a source of iron ions; ii) a source of hydroxide ion, wherein said source of iron ions and said source of hydroxide ions are added concurrently; and iii) at least one carboxylic acid, wherein the molar ratio of the carboxylic acid to iron ions is greater than about 2.6; (b) heating or cooling the reaction mixture to a temperature in the range of about 0° C. to about 100° C., thereby directly forming in the reaction mixture an aqueous dispersion of crystalline iron-containing nanoparticles.

In other particular embodiments, wherein the source of iron ions and the source of hydroxide ions are added concurrently (i.e. double jet addition), the molar ratio of the carboxylic acid to iron ions is greater than about 3.2, or greater than about 3.9.

In particular embodiments the iron-containing nanoparticles comprise an iron oxide.

In various embodiments the source of iron ions, includes, for example, any source of ferrous ($Fe^{2+}$) ion or ferric ($Fe^{3+}$) ion that is at least partially soluble in water. In specific embodiments, the source of ferrous ion is ferrous chloride, ferrous chloride tetrahydrate, ferrous acetate, ferrous acetylacetonate, ferrous lactate or ferrous oxalate. In specific embodiments, the source of ferric ion is ferric nitrate, ferric nitrate nonahydrate, ferric acetate, ferric acetylacetonate, ferric chloride, ferric chloride hexahydrate or ferric oxalate.

In a particular embodiment, the source of metal ions consists of iron ions, with the exception of impurity ions that are naturally present.

In particular embodiments, the source of metal ions consists essentially of iron ions, with the exception of metal ions that do not materially affect the basic and novel characteristics of the invention.

In particular embodiments, dopant ions including ions of platinum, palladium, gold, vanadium, zirconium, or combinations thereof, in total dopant concentrations less than 50%, less than about 40%, less than about 30%, less than about 20%, less than about 10% and less than about 5%.

In a specific embodiment, the dopant ions include cerium ions in concentrations less than about 4%.

In particular embodiments the carboxylic acid is a low molecular weight carboxylic acid, such as, for example, acetic acid or propionic acid.

In particular embodiments the carboxylic acid is a polycarboxylic acid, such as, for example, citric acid or malic acid.

In particular embodiments the ether carboxylic is a low molecular weight ether carboxylic acid given by formula (I):

wherein:
R represents hydrogen or a substituted or unsubstituted alkyl group or a substituted or unsubstituted aromatic group;
$R^1$ represents hydrogen or an alkyl group;
Y represents H or a counterion; and
n is 0-5.

In specific embodiments, the nanoparticle stabilizer is a monoether carboxylic acid, such as, but not limited to, methoxyacetic acid (MAA), ethoxyacetic acid, 3-methoxypropionic acid, and combinations thereof.

In specific embodiments, the nanoparticle stabilizer is a polyether carboxylic acid, such as, but not limited to, 2-[2-(2-methoxyethoxy)ethoxy]acetic acid (MEEAA) and 2-(2-methoxyethoxy)acetic acid (MEAA).

In various embodiments, the carboxylic acid is added to the reaction mixture, in whole or in part, prior to, along with or after the addition of the iron and dopant metal ions. In various embodiments, the ether carboxylic acid is added, in whole or in part, prior to, during or after the formation of iron-containing nanoparticles.

The reaction mixture may further comprise an oxidant, such as, for example, molecular oxygen, present, for example, in air. In other embodiments an oxidant more oxidizing than molecular oxygen is employed. In various embodiments, an oxidant in the form of an alkali metal or ammonium perchlorate, chlorate, hypochlorite, or persulfate; ozone, a peroxide, such as hydrogen peroxide ($H_2O_2$) or tert-butyl hydroperoxide, or a combination of oxidants, is optionally employed.

In various embodiments, the amount of oxidant optionally employed varies widely in relation to the total amount of metal ions present. In particular embodiments the molar amount of oxidant present is equal to or greater than the total molar amount of metal ions. In specific embodiments, two-electron oxidants, such as hydrogen peroxide, are present in at least one-half the molar concentration of total oxidizable metal ions, such as ferrous ion or cerous ion.

In various embodiments, the oxidant is added to the reaction mixture alone or concurrently with one or more of the other reactants.

The particular embodiments, various mixing devices known in the art are employed to stir, mix, shear or agitate the contents of the reaction mixture. In particular embodiments, a colloid mill or a Silverson® High Shear Mixer is employed. In particular embodiments, one or more of the reactants is introduced below the surface of the aqueous reaction mixture. In a particular embodiment, a reactant is introduced below the surface of the aqueous reaction mixture in close proximity to a mixing device.

In particular embodiments the source of hydroxide ion includes, but is not limited to, alkali metal hydroxides, such as sodium or potassium hydroxide, ammonium hydroxide, and water soluble amines.

In various embodiments, the molar ratio of hydroxide ion to total metal ions varies widely. In particular embodiments the molar ratio of hydroxide ion to metal ions ranges from about 3 to about 12. In other embodiments, the pH in the reaction mixture is less than about 9, less than about 8, less than about 7, less than about 6, less than about 5, less than about 4, less than about 3 and less than about 2. In another embodiment the pH in the reaction mixture is maintained at a value less than 5, or less than 4.5.

In various embodiments, the duration in time over which the hydroxide ion is added to the reaction mixture ranges from a few seconds to several minutes. In particular embodiments, the duration of the hydroxide ion addition ranges from about 1-60 minutes.

In particular embodiments, iron hydroxide complexes or iron hydroxide particles are formed in the reaction mixture. In other embodiments, metal hydroxide complexes or metal hydroxide particles of a metal ion (M) other than iron, are formed in the reaction mixture. In another embodiment, mixed metal hydroxide complexes or mixed metal hydroxide particles are formed in the reaction mixture.

In a particular embodiment, the temperature of the reaction mixture is maintained at ambient temperature. In various embodiments, the temperature at which the reaction mixture is maintained by heating or cooling ranges from 0° C. to about 100° C. In other embodiments, the temperature of the reaction mixture exceeds 100° C. In particular embodiments, the temperature of the reaction mixture is maintained at less than 90° C., at less than 85° C., at less than 80° C., at less than 75° C., at less than 70° C., at less than 65° C., at less than 60° C., at less than 55° C., at less than 50° C., at less than 45° C. or less than 40° C.

In embodiments employing elevated reaction temperatures, the duration of time at elevated temperature may vary widely, for example, from minutes to hours. In particular embodiments, a reaction temperature in the range of about 40° C. to about 85° C. is maintained for a time ranging from about 10 minutes to about 4 hours.

In particular embodiments, a reaction mixture comprising an oxidant and/or reaction conditions comprising elevated temperature, result in the oxidation or dehydration of a complex or nanoparticle of an iron hydroxide to form a complex or nanoparticle of an iron oxide.

In particular embodiments, reaction conditions comprising an oxidant and/or elevated temperature result in the oxidation or dehydration of a complex or nanoparticle of an iron hydroxide to form an iron oxide complex or a crystalline or semi-crystalline iron oxide nanoparticle.

In accordance with another embodiment of the first aspect of the invention, wherein a specific order of addition of reactants is employed, a method of producing iron-containing nanoparticles in an aqueous dispersion comprises: (a) forming an aqueous first reaction mixture comprising a source of hydroxide ion and a source of at least one ether carboxylic acid nanoparticle stabilizer; (b) adding a source of iron ions and, optionally a source of one or more metal ions (M) other than iron, wherein the molar ratio of the ether carboxylic acid nanoparticle stabilizers to total metal ions is greater than about 2.6, to form a second reaction mixture; (c) optionally adding an oxidant; and (d) maintaining the reaction mixture at a temperature permitting the formation of an aqueous dispersion of crystalline iron-containing nanoparticles. In this embodiment, the addition of the source of hydroxide ions precedes the addition of the source of iron ions. In a particular embodiment, a method using this order of addition is performed at ambient temperature.

In another particular embodiment, a method using this order of addition is performed under an atmosphere of air. In still another particular embodiment, a method using this order of addition is performed at ambient temperature and under an atmosphere of air, results in the formation of an aqueous dispersion comprising crystalline hydrous ferric oxyhydroxide nanoparticles.

In another embodiment, an order of addition of reacts comprises adding the carboxylic acid, source of hydroxide ion and a source of an oxidant prior to the addition of the source of iron ions.

In various embodiments, dispersions of the invention have an iron compound concentration which can be at least 8%, more particularly at least 15% and still more particularly at least 30%, this concentration being expressed as the equivalent weight of iron oxide with respect to the total dispersion weight. This concentration can be up to about 40%. Alternatively, the weight percentage of elemental iron with respect to the total dispersion weight may be reported.

In a particular embodiment, organic colloidal dispersions comprising iron-containing oxide nanoparticles produced according to the inventive methods can have concentrations by weight of elemental iron or an iron oxide in the range of about 5-20%, or greater. Such materials are directly useful for application as fuel additives for the purpose of improving combustion of soot in diesel particulate filters. In one embodiment, such materials are stored in a separate tank and periodically injected into the fuel. In other embodiments, they are put directly in the fuel prior to fueling a particular vehicle or craft. In any of these embodiments, these materials may also improve engine fuel efficiency and/or reduce emissions of noxious gases, along with reducing the emission of particulate matter t (e.g. soot).

Figure 6:
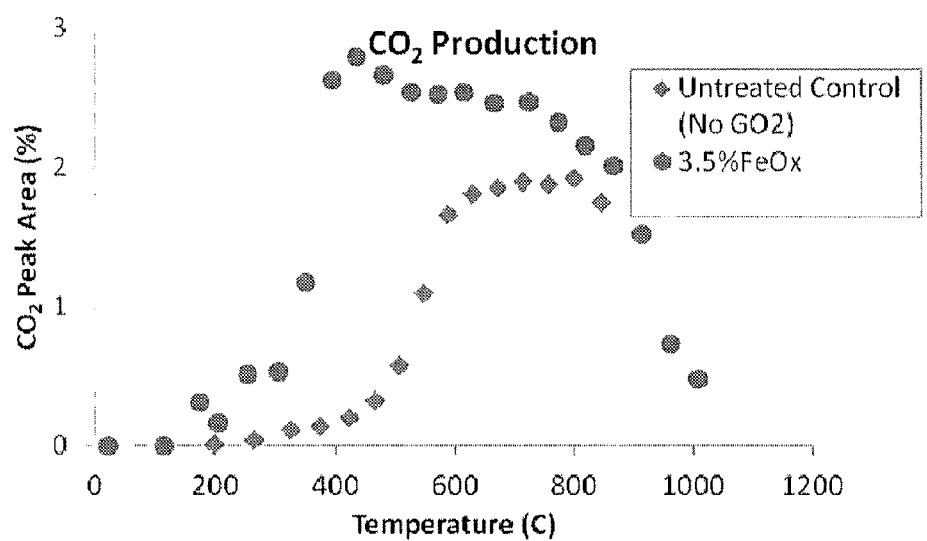
FIG. 6 is a plot of $CO_2$ emission as a function of increasing temperature for a mixture of carbon and the catalytic iron-containing nanoparticles prepared in inventive Example 3k, when exposed to an $O_2$-containing gas stream. Also shown is the response for a carbon control absent the catalytic iron-containing nanoparticles.

In particular embodiments, one particular advantage of crystalline iron-containing nanoparticles of the invention, which has been shown experimentally by the inventors, is the reduction in ignition (light-off) temperature of carbonaceous material. Light-off temperature refers to that temperature at which the carbonaceous soot material in an engine exhaust gas stream/filter or a simulated exhaust gas stream/filter begins to burn and be consumed. The term is also known in the art as the soot combustion onset temperature. The method used to ascertain light-off temperature is described in detail in Example 6 below. In general, carbon material was imbibed with various nanoparticle-containing dispersions. Nanoparticles used included a composition comprised of pure cerium oxide $CeO_2$, a mixed-phase iron-ceria composition, and the inventive crystalline iron-containing oxide composition. Of these the best performing for reduction of light-off temperature was found to be the crystalline iron-containing oxide composition. Advantageously, iron is significantly lower in cost than cerium and is generally benign biologically. The light-off temperature for simulated soot treated with a crystalline iron-containing oxide nanoparticle dispersion of the invention was found experimentally to be below 200° C., as shown in FIG. 6. To date, this temperature is lower than that reported thus far for any iron-based DPF combustion catalyst fuel additive. For comparison, the response for combustion of an untreated carbon control is also shown in FIG. 6. Light-off temperature is shown to be substantially higher absent the crystalline iron-containing nanoparticles.

In accordance with a second aspect of the current invention, a process for preparing an iron-containing nanoparticle dispersion, comprises: (a) obtaining an aqueous dispersion of iron-containing nanoparticles; (b) adding an immiscible carboxylic acid and, optionally a substantially non-polar solvent; (c) mixing the liquid mixture of step (b) to form an emulsion; (d) allowing the immiscible substantially non-polar phase to separate from a remnant aqueous phase; and, (e) collecting the separated substantially non-polar phase comprising a dispersion of iron-containing nanoparticles.

In particular embodiments of the second aspect of the current invention, a stable aqueous iron-containing nanoparticle dispersion formed according to one of the various embodiments of the first aspect of the invention, is further processed such that the nanoparticles are efficiently extracted from the aqueous medium and transferred to a substantially non-polar phase. This aspect of the invention relies, in part, on the discovery of the unexpected and surprising effectiveness of immiscible carboxylic acids in facilitating the extraction or transfer of these particular iron-containing nanoparticles from the aqueous phase to a substantially non-polar solvent, at relatively low process temperatures, at high rates, and in high yields, when the pH of the aqueous iron-containing nanoparticle dispersion is adjust into a preferred range.

In particular embodiments, extraction of the iron-containing nanoparticles from the aqueous colloid phase can occur at room temperature or modestly elevated temperatures in minutes, rather than in hours.

In particular embodiments, the immiscible carboxylic acid is octanoic acid, 2-ethylhexanoic acid, oleic acid, stearic acid, isostearic acid, polyisobutylene succinic acid, or combinations thereof.

In a particular embodiment of the process, the aqueous crystalline iron-containing nanoparticle dispersion prepared according to the first aspect of the invention, is combined and mixed with an immiscible carboxylic acid to form an emulsion, the emulsion is allowed to separate into a remnant aqueous phase and an organic phase comprising the nanoparticles and the immiscible carboxylic acid, and the product organic nanoparticle dispersion phase is collected, for example, by decantation. In a particular embodiment, a substantially non-polar solvent is added to the product organic nanoparticle dispersion phase. In another particular embodiment, the immiscible carboxylic acid is premixed with a substantially non-polar solvent to form a combined organic phase, and the nanoparticles are subsequently extracted into this combined organic phase.

Reduced temperatures and reduced time at temperature during the extraction process provide benefits in regard to lower process energy costs and, moreover, improved safety via reduced risk of hazard in managing the combustible organic solvent during processing, relative to prior art processes. Simplified equipment and facility requirements are also potential benefits.

In applications wherein the end use is as a hydrocarbon fuel additive, the substantially non-polar solvent is commonly termed an organic diluent, and may be comprised of any solvent that is miscible in the hydrocarbon fuel. In various embodiments, the organic diluent may include kerosene, naphtha, gasoline, diesel fuel, biodiesel fuel, commercially available petroleum derivatives, such as isoparafin distillates (e.g. Isopar®), hydrotreated petroleum distillates (e.g. Kensol® 48H and Kensol® 50H available from American Refining Group, Ltd of Bradford, Pa. (USA); or Calumet 420-460 available from Calumet Lubricants Co. of Cotton Valley, La. (USA)). In particular embodiments, the organic diluents have a low sulfur content, high flashpoint, and low concentration of components having unsaturated bonds, such as Kensol® 48H, Kensol® 50H, and Isopar®. Organic diluents having some concentration of aromatics, for example Solvesso® type solvents, are also useful for the purposes of the invention.

In various embodiments, other materials may be optionally added to the substantially non-polar product dispersion to enhance colloidal stability, to enhance low temperature flow properties, and to raise the flashpoint temperature of the substantially non-polar product organic iron-containing nanoparticle dispersion, and to provide other advantages as set forth below. In particular embodiments, an anhydride is added to the organic phase, organic diluent or substantially non-polar product dispersion for the purpose of, for example, but not limited to, reducing free water content or inhibiting the fouling of injectors in diesel engines. In specific embodiments, the anhydride is hexanoic anhydride, octanoic anhydride, decanoic anhydride, dodecanoic anhydride, polyisobutylene succinic acid, polyisobutylene succinic anhydride, alkenyl succinic anhydrides (e.g. 16 ASA (CAS: 32072-96-1) and 18 ASA (CAS: 28777-98-2) available from Albemarle Corporation), or combinations thereof.

In some embodiments, it has been found that the efficacy of the extraction process is dependent on the pH of the aqueous iron-containing nanoparticle dispersion (reactant mixture), and on the amount of ether carboxylic acid nanoparticle stabilizer present. In various embodiments, it has been found by the inventors that the extraction process becomes progressively more facile as the pH of the aqueous crystalline iron-containing nanoparticle dispersion is adjusted into a range of about 4 to about 5. At the same time, however, it has been observed that nanoparticle size, as measured by DLS, increases as a result of increasing the pH into a range of about 4.0 to about 5.2, as is shown in TABLE 1 below. Thus, it has been found that, in general, a trade-off exists between the measured nanoparticle size and the efficacy of extraction of the nanoparticles from the aqueous phase to an organic phase. The measured particle size increase may reflect particle agglomeration.

In a third aspect of the current invention, a process comprises adjusting the pH of an aqueous crystalline iron-containing nanoparticle dispersion into a range of about 4 to about 5, and extracting the nanoparticles from the aqueous medium and transferring to a substantially non-polar phase. In particular embodiments, the substantially non-polar phase comprises an immiscible carboxylic acid and/or an organic diluent.

In particular embodiments, the aqueous crystalline iron-containing nanoparticle dispersion is adjusted from a pH less than 4, into a pH range of about 4 to about 5, by the addition of an alkaline material (base), prior to extraction of the nanoparticles into the substantially non-polar phase.

In a particular embodiment, it has been observed that when the pH of the aqueous nanoparticle dispersion is adjusted by the addition of a strong base, such as ammonium hydroxide, some nanoparticle agglomeration and precipitation occurs.

In other embodiments, the pH of the aqueous nanoparticle dispersion is adjusted into a range of about 4 to about 5 by the addition of an organic amine to the organic phase, such that the organic amine is present during the extraction process. In various embodiments, organic amines useful for this purpose include, but are not limited to, octylamine, 2-octylamine, 2-ethylhexylamine, various tertiary alkyl primary amines (sterically hindered amines, such as tert-octylamine), ethanolamine, triethanolamine, and combinations thereof.

TABLE 1

| Case | pH | MAA/Iron Molar Ratio | Particle Size (by DLS) | Octylamine Added | Extraction Efficacy |
|---|---|---|---|---|---|
| 1 | 3.3 | 4 | 4.9 nm | No | Poor |
| 2 | 4.3 | 4 | 4.3 nm | Yes | Good |
| 3 | 4.5 | 4 | 9.8 nm | Yes | Good |
| 4 | 4.7 | 4 | 17.2 nm | Yes | Good |
| 5 | 8.25 | 4 | Sediment | No | Poor |
| 6 | 4.6 | 6 | 4.3 nm | No | Poor |

In Case 1, wherein the aqueous iron-containing nanoparticle dispersion was at a pH of 3.3, small particle size is obtained, but poor extraction resulted.

In Cases 2-4, wherein the pH of the aqueous iron-containing nanoparticle dispersion was adjusted to a range of about 4.3 to about 4.7, good extraction of the iron-containing nanoparticles was achieved into an organic phase that contained octylamine and octanoic acid, the latter in an amount equimolar to iron in the aqueous phase. In Cases 3-4, extraction was achieved with less organic base (octylamine) than that used in Case 2, but with a substantial increase in particle size.

In Case 5, wherein the pH was adjusted to near neutral, extraction failed as precipitates were formed.

In Case 6, wherein a higher molar ratio of MAA/iron of 6 was employed to stabilize the nanoparticles, thereby resulting in a smaller particle size, poor extraction resulted.

Thus, in particular embodiments, addition of an organic amine to the organic phase in combination with adjustment of the aqueous phase pH, resulted in both small particle size and good extraction.

In variations of Cases 3-4, wherein the molar amount of octanoic acid in the organic phase was increased such that it exceeded the molar amount of iron in the aqueous phase, good extraction in the absence of the organic amine addition was achieved.

The invention is further illustrated by the following examples, which are not intended to limit the invention in any manner.

EXAMPLES

Nanoparticle Scattering and Size Assessments

A simple qualitative characterization of the particle dispersions was performed by assessing the degree of Tyndell scattering exhibited by the dispersions when illuminated by a red laser pen light, relative to the amount of scattering from a sample of the neat solvent. A quantitative assessment of the particle size of the nanoparticle dispersions was performed by dynamic light scattering (DLS) using a Brookhaven 90Plus Particle Size Analyzer (Brookhaven Instruments Corp., Holtzville, N.Y., U.S.A.) equipped with a quartz cuvette. Reported DLS hydrodynamic particle sizes are the log normal number weighted parameter.

Powder X-ray Diffraction Measurements:

X-ray diffraction spectra were recorded on a Rigaku D2000 diffractometer equipped with a copper rotating anode, diffracted beam graphite monochromator tuned to copper K-alpha radiation, and a scintillation detector. Particle size estimation by peak-width analysis of XRD spectra was done using the Scherrer method.

For wide angle XRD data, the collection slits used were a ½ degree divergence slit, ½ degree scatter slit, and a 0.6 mm receiving slit. For particles with particularly small size and narrow size distribution, low angle XRD data were collected using a ¼ degree divergence slit, ¼ degree scatter slit, and 0.3 mm receiving slit.

Example 1 presents some of the limitations of the double jet additions of the prior art (US 2010/0242342) wherein a sediment of iron-containing particles is formed.

Example 1

Double Jet Precipitation of Iron Oxides

Comparative

Example 1a: Double Jet Addition with MAA/Iron Ratio of 2.4 (Comparative)

To a 3 liter round bottom stainless steel reactor vessel was added 1117 grams of distilled water. An impeller (Lightnin® R-100 Rushton style turbine) was lowered into the reactor vessel, and the mixer head was positioned slightly above the bottom of the reactor vessel. The mixer was set to 700 rpm, and the reactor was brought to a temperature of about 70° C. Then 59.8 grams (98%) of methoxyacetic acid was added to the reactor. A double jet addition was conducted over a period of five minutes by pumping a 250 ml solution containing 111.6 grams of $Fe(NO_3)_3 \cdot 9H_2O$ into the reactor concurrently with a solution containing 69.5 grams (28-30%) of ammonium hydroxide. A distilled water chase into the reactor cleared the reactant lines of residual materials. Then 10.2 grams of 50% non-stabilized hydrogen peroxide was added to the reactor and its contents over a period of 40 seconds. The product of the reaction was a turbid brown solution which separated into a lower sediment portion and an upper portion that failed to clarify upon extended standing. The molar ratio of methoxyacetic acid to iron for this example was 2.40.

Figure 2:
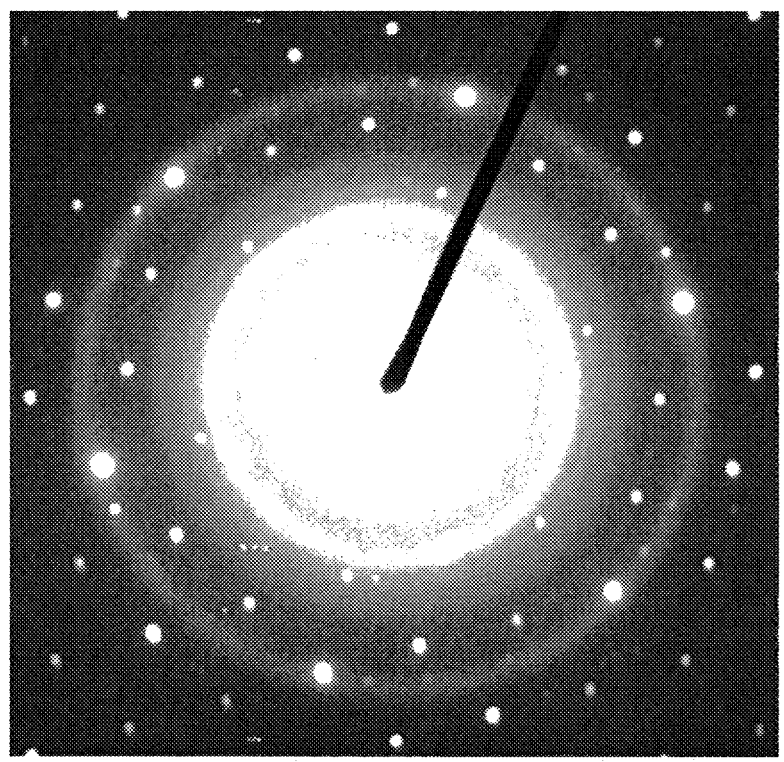

FIG. 1 is a TEM image representative of the particles prepared in Example 1a, wherein a particle size of approximately 0.8 micrometers (800 nm) is shown. FIG. 2 is an electron diffraction pattern of the micron sized iron containing oxide particles prepared in Example 1a. The electron diffraction peaks are most consistent with the iron oxyhydroxide phase Goethite.

Example 1b: Double Jet Addition with MAA/Iron Ratio of 2.48 (Comparative)

To a 600 ml Erlenmeyer flask containing a one inch magnetic stir bar, 8.13 grams of (98%) methoxyacetic acid (MAA) and 130 ml of distilled water were introduced. The flask was then placed into a water bath at a temperature of about 65° C. with constant bar stirring. A metal salt solution containing 7.35 grams of iron (III) nitrate nonahydrate, 98% $Fe(NO_3)_3 \cdot 9H_2O$, dissolved in 10 grams distilled water (total solution volume of 10-11 ml), was drawn into a syringe pump and then subsequently pumped at a rate of 3 ml/minute into the MAA containing flask. Concurrent with the start of the iron salt solution addition, an aliquot of about 10 ml of concentrated (28-30%) ammonium hydroxide was pumped into the reaction vessel at a rate of 1.5 ml/minute. The actual amount of ammonium hydroxide to be delivered is dependent on the desired pH of the reaction. Ammonium hydroxide was added until a pH of 4.5 was achieved at which time the addition was stopped. A 25 ml aqueous solution containing 2.4 grams of 50 wt. % hydrogen peroxide was then pumped into the reaction flask at a rate of 5 ml/minute via a syringe pump. At the midpoint of the hydrogen peroxide addition, a solution containing 7.35 grams of iron (III) nitrate nonahydrate, 98% $Fe(NO_3)_3 \cdot 9H_2O$, dissolved in 10 ml of distilled water (total solution volume 10-11 ml) was added at a rate of 3 ml/minute concurrently with the remaining half of the hydrogen peroxide. When all reagents had been added, the reaction mixture was a turbid orange brown color. The reaction mixture was then heated for an additional 60 minutes at 65° C. The reaction mixture was cooled, and after standing unstirred for several hours, a light brown sediment occupied the bottom third of the reaction vessel, while the top portion was a slightly turbid deep brown color. The molar ratio of methoxyacetic acid stabilizer to total metals was 2.48.

Particle size analysis of the slightly turbid deep brown supernatant by dynamic light scattering indicated a hydrodynamic diameter of about 28 nm. Particle size analysis of a dispersion of the light brown sediment by dynamic light scattering indicated a hydrodynamic diameter of about 176 nm. These results are substantially similar to those obtained above in Example 1a, wherein iron oxides were prepared using an alternative method.

In each case prior art methods produced 1) particle sizes much too large for the intended application as a DPF soot combustion catalyst, and 2) unstable particle dispersions that formed sediments.

Example 2 illustrates various embodiments of the invention for double jet addition of reactants to form iron-containing nanoparticles in the presence of methoxyacetic acid.

Example 2a: Double Jet Addition with MAA/Iron Ratio of 3.91 (Inventive, CeO-489)

To a 3 liter round bottom stainless steel reactor vessel was added 1118 grams of distilled water. An impeller (Lightnin® R-100 Rushton style turbine) was lowered into the reactor vessel, and the mixer head was positioned slightly above the bottom of the reactor vessel. The mixer was set to 700 rpm, and the reactor was brought to a temperature of about 85° C.

Then 104.9 grams (98%) of methoxyacetic acid was added to the reactor. A double jet addition was conducted over a period of three minutes by pumping a 150 ml solution containing 120.5 grams of $Fe(NO_3)_3.9H_2O$ into the reactor concurrently with a solution containing 100 ml (28-30%) of ammonium hydroxide. The ammonium hydroxide addition was stopped when a reaction mixture pH of 3.0 was achieved. A distilled water chase into the reactor cleared the reactant lines of residual materials. The reaction mixture was then heated for an additional 60 minutes at 85° C. The reaction mixture was cooled, and after standing unstirred for several hours, a stable, clear, brown/orange colored, aqueous nanoparticle dispersion was formed. The molar ratio of methoxyacetic acid to iron for this example was 3.91.

The product dispersion displayed a high degree of Tyndall scattering when illuminated with a low intensity LASER beam, indicating it contained well-dispersed colloidal particles. Particle size analysis by dynamic light scattering indicated a hydrodynamic diameter of 4.5 nm.

Example 2b: Double Jet Addition with MAA/Iron Ratio of 3.91 (Inventive, CeO-491)

To a 3 liter round bottom stainless steel reactor vessel was added 1118 grams of distilled water. An impeller (Lightnin® R-100 Rushton style turbine) was lowered into the reactor vessel, and the mixer head was positioned slightly above the bottom of the reactor vessel.

The mixer was set to 700 rpm, and the reactor was brought to a temperature of about 25° C. Then 104.9 grams (98%) of methoxyacetic acid was added to the reactor. A double jet addition was conducted over a period of three minutes by pumping a 150 ml solution containing 120.5 grams of $Fe(NO_3)_3.9H_2O$ into the reactor concurrently with a solution containing 100 ml (28-30%) of ammonium hydroxide. The ammonium hydroxide addition was stopped when a reaction mixture pH of 4.5 was achieved. A distilled water chase into the reactor cleared the reactant lines of residual materials. The reaction mixture was then heated to 85° C. and held for an additional 60 minutes at 85° C. The reaction mixture was cooled, and after standing unstirred for several hours, a stable, clear, brown/orange colored, aqueous nanoparticle dispersion was formed. The molar ratio of methoxyacetic acid to iron for this example was 3.91.

The product dispersion displayed a high degree of Tyndall scattering when illuminated with a low intensity LASER beam, indicating it contained well-dispersed colloidal particles. Particle size analysis by dynamic light scattering indicated a hydrodynamic diameter of 24.4 nm.

Example 2c: Double Jet Addition with MAA/Iron Ratio of 4.64 (Inventive, CeO-512)

To a 3 liter round bottom stainless steel reactor vessel was added 1118 grams of distilled water. An impeller (Lightnin® R-100 Rushton style turbine) was lowered into the reactor vessel, and the mixer head was positioned slightly above the bottom of the reactor vessel. The mixer was set to 700 rpm, and the reactor was brought to a temperature of about 25° C. Then 127.2 grams (98%) of methoxyacetic acid was added to the reactor. A double jet addition was conducted over a period of three minutes by pumping a 150 ml solution containing 120.5 grams of $Fe(NO_3)_3.9H_2O$ into the reactor concurrently with a solution containing 100 ml (28-30%) of ammonium hydroxide. The ammonium hydroxide addition was stopped when a reaction mixture pH of 4.5 was achieved. A distilled water chase into the reactor cleared the reactant lines of residual materials. Then 15.6 grams of 50% non-stabilized hydrogen peroxide was added to the reactor and its contents over a period of 40 seconds. The reaction mixture was then heated to 75° C. and held for an additional 60 minutes at 75° C. The reaction mixture was cooled, and after standing unstirred for several hours, a stable, clear, brown/orange colored, aqueous nanoparticle dispersion was formed. The molar ratio of methoxyacetic acid to iron for this example was 4.64.

The product dispersion displayed a high degree of Tyndall scattering when illuminated with a low intensity LASER beam, indicating it contained well-dispersed colloidal particles. Particle size analysis by dynamic light scattering indicated a hydrodynamic diameter of 4.3 nm.

Comparison of the results shown above for the various double jet additions performed in Example 1 and Example 2, wherein the relative molar amount of methoxyacetic acid to iron ions was increased substantially in Example 2, indicates that a surprisingly large reduction in particle size (from a range of about 175-800 nm to a range of about 4-24 nm) and improvement in dispersion stability (i.e. elimination of sediment) is provided.

Example 3 illustrates various embodiments of the invention for single jet addition of reactants.

Example 3

Example 3a: Single Jet Addition with MAA/Iron Ratio of 1.2 (Comparative, LI-297)

To a 2 liter beaker, 121 g of ferric nitrate nonahydrate was dissolved in 1040 ml distilled water, and 33.0 g of methoxyacetic acid (98%) was added while mixing with a magnetic stir bar in an air environment. This represents a molar ratio of methoxyacetic acid to ferric nitrate of 1.2. The reaction mixture was held at an ambient temperature of 25° C. Next 132 g of 14.5 M ammonium hydroxide was metered into the reaction mixture over a period of 17 minutes. The pH of the reaction mixture reached a maximum of about 4.64. The reaction mixture became somewhat turbid, possibly indicating a degree of agglomeration of nanoparticles. At that point 14.6 g of 50% hydrogen peroxide was added to the reaction mixture, and the temperature was raised to 70° C. over 25 minutes and held at 70° C. for 1 hour. Upon cooling a brown sediment was observed.

Example 3b: Single Jet Addition with MAA/Iron Ratio of 1.8 (Inventive, LI-302)

The procedures of Example 3a were repeated, except that the amount of methoxyacetic acid was increased such that the molar ratio of methoxyacetic acid to ferric nitrate was 1.8.

A stable, clear, deep brown/orange colored aqueous nanoparticle dispersion was formed. Dynamic Light Scattering analysis of the product dispersion revealed a particle size of 28 nm.

Example 3c: Single Jet Addition with MAA/Iron Ratio of 2.4 (Inventive, LI-295)

The procedures of Example 3a were repeated, except that the amount of methoxyacetic acid was increased such that the molar ratio of methoxyacetic acid to ferric nitrate was 2.4.

A stable, clear, deep brown/orange colored aqueous nanoparticle dispersion was formed. Dynamic Light Scattering analysis of the product dispersion revealed a particle size of 12.5 nm.

Example 3d: Single Jet Addition with MAA/Iron Ratio of 2.4 (Inventive, LI-285)

The procedures of Example 3c were repeated, except that the ammonium hydroxide addition was stopped when a reaction mixture pH of 3.0 was attained.

A stable, clear, deep brown/orange colored aqueous nanoparticle dispersion was formed. Dynamic Light Scattering analysis of the product dispersion revealed a particle size of 11 nm.

Example 3e: Single Jet Addition with MAA/Iron Ratio of 2.6 (Inventive, CeO-473)

To a 3 liter round bottom stainless steel reactor vessel was added 1218 grams of distilled water. An impeller (Lightnin® R-100 Rushton style turbine) was lowered into the reactor vessel, and the mixer head was positioned slightly above the bottom of the reactor vessel. The mixer was set to 700 rpm, and the reactor was brought to a temperature of about 85° C. Then 69.9 grams of (98%) methoxyacetic acid was added to the reactor. A 43 ml solution of (28-30%) ammonium hydroxide was added over a time period of 200 seconds. The ammonium hydroxide addition was stopped when a reaction mixture pH of 4.5 was achieved. A 100 ml solution containing 120.5 grams of $Fe(NO_3)_3 \cdot 9H_2O$ was added to the reactor. A distilled water chase into the reactor cleared the reactant lines of residual materials. Then 20.6 grams of 50% non-stabilized hydrogen peroxide was added to the reactor and its contents over a time period of 5 minutes. The reaction mixture was then held for an additional 60 minutes at 85° C. The reaction mixture was cooled, and after standing unstirred for several hours, a stable, clear, brown/orange colored, aqueous nanoparticle dispersion was formed with a pH of 1.48. The molar ratio of methoxyacetic acid to iron for this example was 2.6.

The product dispersion displayed a high degree of Tyndall scattering when illuminated with a low intensity LASER beam, indicating it contained well-dispersed colloidal particles. Particle size analysis by dynamic light scattering indicated a hydrodynamic diameter of 6.9 nm.

Example 3f: Single Jet Addition with MAA/Iron Ratio of 2.6 (Inventive, CeO-465)

To a 3 liter round bottom stainless steel reactor vessel was added 1218 grams of distilled water. An impeller (Lightnin® R-100 Rushton style turbine) was lowered into the reactor vessel, and the mixer head was positioned slightly above the bottom of the reactor vessel. The mixer was set to 700 rpm, and the reactor was brought to a temperature of about 85° C. Then 69.9 grams of (98%) methoxyacetic acid was added to the reactor. A 43 ml solution of (28-30%) ammonium hydroxide was added over a time period of 200 seconds. The ammonium hydroxide addition was stopped when a reaction mixture pH of 4.5 was achieved. Then 20.6 grams of 50% non-stabilized hydrogen peroxide was added to the reactor and its contents over a time period of 5 minutes. A 100 ml solution containing 120.5 grams of $Fe(NO_3)_3 \cdot 9H_2O$ was added to the reactor. A distilled water chase into the reactor cleared the reactant lines of residual materials. The reaction mixture was then held for an additional 60 minutes at 85° C. The reaction mixture was cooled, and after standing unstirred for several hours, a stable, clear, brown/orange colored, aqueous nanoparticle dispersion was formed with a pH of 1.51. The molar ratio of methoxyacetic acid to iron for this example was 2.6.

The product dispersion displayed a high degree of Tyndall scattering when illuminated with a low intensity LASER beam, indicating it contained well-dispersed colloidal particles. Particle size analysis by dynamic light scattering indicated a hydrodynamic diameter of 4.6 nm.

Example 3g: Single Jet Addition with MAA/Iron Ratio of 2.4 (Inventive, LI-283)

The procedures of Example 3a were repeated, except that the amount of methoxyacetic acid was increased such that the molar ratio of methoxyacetic acid to ferric nitrate was 2.75.

A stable, clear, deep brown/orange colored aqueous nanoparticle dispersion was formed. Dynamic Light Scattering analysis of the product dispersion revealed a particle size of 5.2 nm.

Example 3h: Single Jet Addition with MAA/Iron Ratio of 3.0 (Inventive, DS-127)

To a 1 liter beaker were added 400 g distilled water and 16 g of methoxyacetic acid (98%) while mixing with a magnetic stir bar. The pH of this mixture was raised to 9 with ammonium hydroxide (28-30%). The reaction mixture was at an ambient temperature of 22° C. Next 150 ml of a solution containing 24 g of dissolved ferric nitrate nonahydrate was added to the reaction mixture over 10 seconds (molar ratio of methoxyacetic acid to ferric nitrate of 3.0). After the addition of the ferric nitrate solution the pH was 4. The reaction mixture became somewhat turbid following the ferric nitrate addition, but, after several minutes, the turbidity subsided leaving a stable, clear, deep brown/orange colored nanoparticle dispersion.

Dynamic Light Scattering analysis revealed a particle size of 6.6 nm. As this number includes contributions from the solvation sphere, geometric nanoparticle size is expected to be smaller. XRD analysis indicated that the nanoparticles were an iron oxyhydroxide phase, Goethite, with a crystallite size of 4.1 nm as determined by the Scherrer technique.

Example 3i: Single Jet Addition with MAA/Iron Ratio of 3.9 (Inventive, CeO-476)

To a 3 liter round bottom stainless steel reactor vessel was added 1218 grams of distilled water. An impeller (Lightnin® R-100 Rushton style turbine) was lowered into the reactor vessel, and the mixer head was positioned slightly above the bottom of the reactor vessel. The mixer was set to 700 rpm, and the reactor was brought to a temperature of about 70° C. Then 104.9 grams of (98%) methoxyacetic acid was added to the reactor. A 80 ml solution of (28-30%) ammonium hydroxide was added over a time period of 6 minutes. The ammonium hydroxide addition was stopped when a reaction mixture pH of 4.5 was achieved. A 100 ml solution containing 120.5 grams of $Fe(NO_3)_3 \cdot 9H_2O$ was added to the reactor. A distilled water chase into the reactor cleared the reactant lines of residual materials. The reaction mixture was then held for an additional 60 minutes at 70° C. The reaction mixture was cooled, and after standing unstirred for several hours, a stable, clear, brown/orange colored, aqueous nanoparticle dispersion was formed. The molar ratio of methoxyacetic acid to iron for this example was 3.9.

The product dispersion displayed a high degree of Tyndall scattering when illuminated with a low intensity LASER beam, indicating it contained well-dispersed colloidal particles. Particle size analysis by dynamic light scattering indicated a hydrodynamic diameter of 2.8 nm.

Example 3j: Single Jet Addition with MAA/Iron Ratio of 4.6 (Inventive, LI-241)

To a 3 liter beaker, 266 g of ferric nitrate nonahydrate was dissolved in 1114 g distilled water, and 275 g of methoxyacetic acid was added while mixing with a magnetic stir bar in an air environment. This represents a molar ratio of methoxyacetic acid to ferric nitrate of 4.6. The reaction mixture was held at an ambient temperature of 25° C. Next 530 g of 7.25 M ammonium hydroxide was metered into the reaction mixture over a period of 50 minutes. The pH of the reaction mixture reached a maximum of 4.65. The reaction mixture became somewhat turbid, indicating a degree of agglomeration of nanoparticles. At that point 34.5 g of 50% hydrogen peroxide was added to the reaction mixture and the temperature was raised to 75° C. over 30 minutes and held at 75° C. for 1 hour. The turbidity was observed to disappear. At this point a stable, clear, brown/orange colored, aqueous nanoparticle dispersion was formed.

Figure 5:
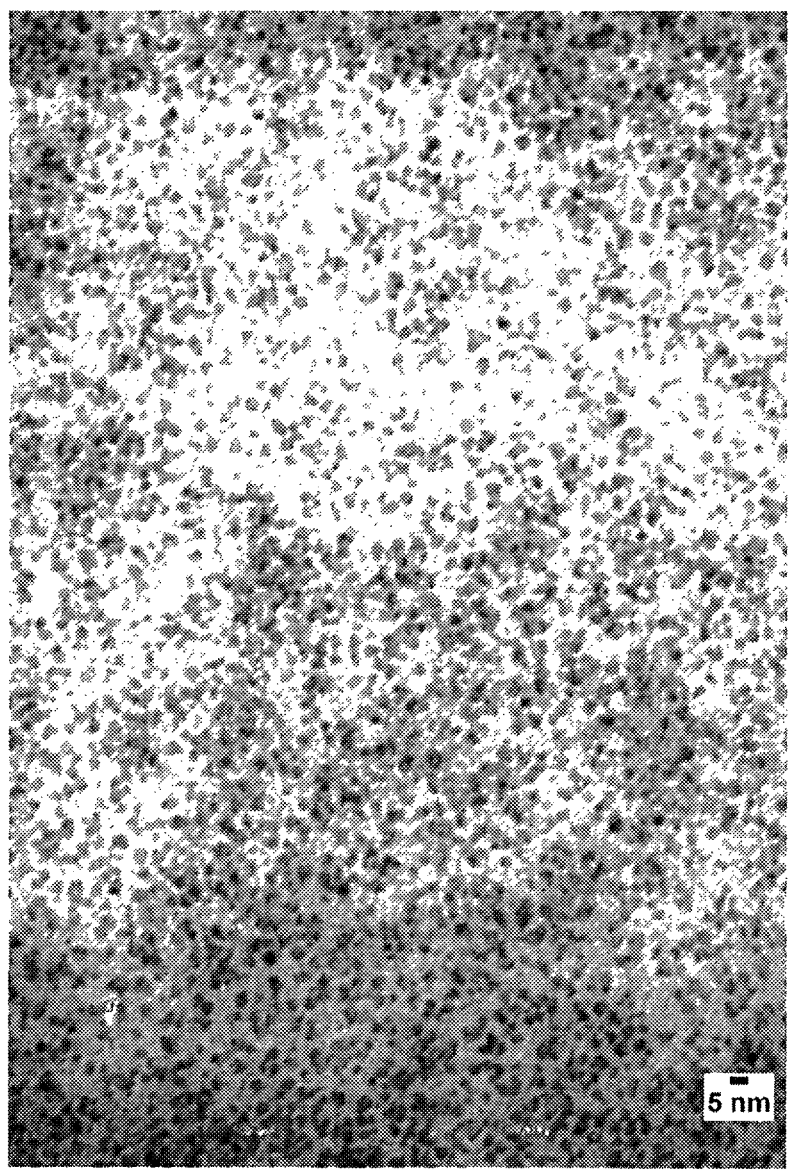
FIG. 5 is a Transmission Electron Micrograph of iron-containing nanoparticles prepared by the inventive process described in Example 3j.

Dynamic Light Scattering analysis revealed a particle size of 3.3 nm. As this number includes contributions from the solvation sphere, geometric nanoparticle size is expected to be smaller. Residual ammonium nitrate was removed from a portion of the resulting dispersion by diafiltration, and this sample was dried to a powder for subsequent XRD studies. XRD experiments confirmed that the nanoparticles were an iron oxide phase with a low angle XRD peak, indicating a uniform particle size, at 2.87 degrees 2θ, corresponding to a spacing of 3.0 nm. The sample was examined by transmission electron microscopy, which revealed a mean particle size of ca. 3 nm (diameter), as shown in FIG. 5.

Example 3k: Single Jet Addition with MAA/Iron Ratio of 4.6 (Inventive, LI-195)

To a 2 liter beaker, 121 g of ferric nitrate nonahydrate was dissolved in 1040 ml distilled water, and 125 g of methoxyacetic acid was added while mixing with a magnetic stir bar in an air environment. This represents a molar ratio of methoxyacetic acid to ferric nitrate of 4.6. The reaction mixture was held at an ambient temperature of 25° C. Next 132 g of 14.5 M ammonium hydroxide was metered into the reaction mixture over a period of 17 minutes. The pH of the reaction mixture reached a maximum of about 4.5. The reaction mixture became somewhat turbid, possibly indicating a degree of agglomeration of nanoparticles. At that point 14.6 g of 50% hydrogen peroxide was added to the reaction mixture, and the temperature was raised to 70° C. over 25 minutes and held at 70° C. for 1 hour. The turbidity was observed to disappear. At this point a stable, clear, deep brown/orange colored aqueous nanoparticle dispersion was formed. Residual ammonium nitrate was removed from the resulting dispersion by diafiltration. The pH of the washed dispersion was about 3.3. Samples of the dispersion were dried down to supply powered samples for XRD analysis.

Dynamic Light Scattering analysis of the product dispersion revealed a particle size of 4.9 nm. As this number includes contributions from the solvation sphere, geometric nanoparticle size is expected to be smaller.

Figure 3:
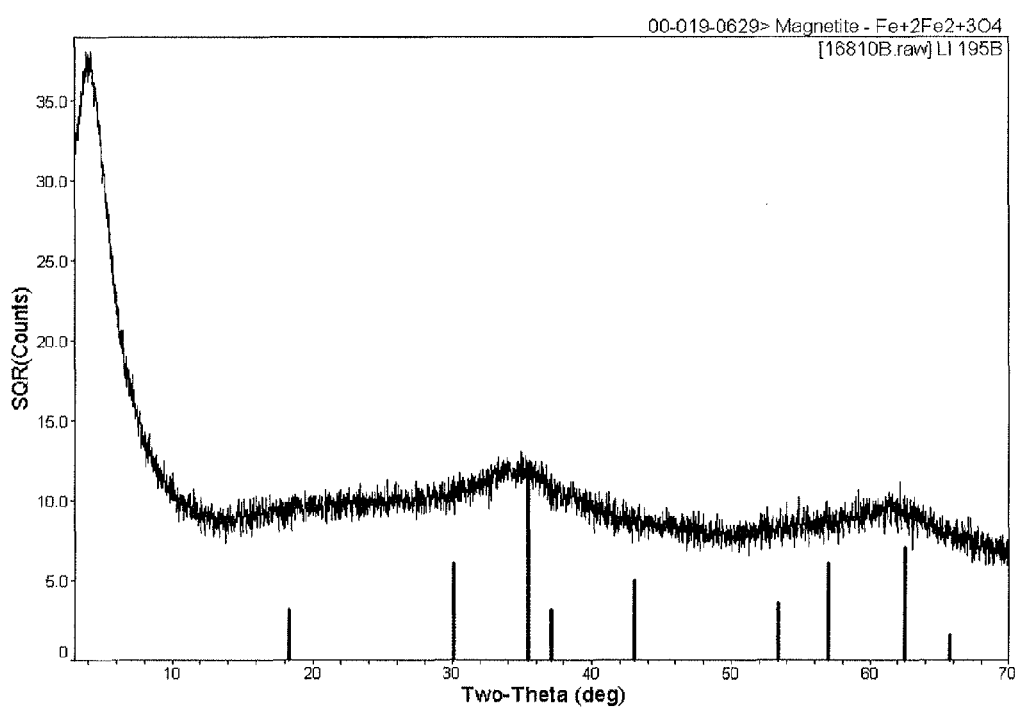
FIG. 3 is a wide-angle powder X-ray diffraction spectrum for iron-containing nanoparticles made in inventive Example 3k.

A wide angle XRD spectrum of a powder sample is shown in FIG. 3. The reference phase index shown as line markers is for magnetite. Absolute crystalline phase identification for the powder sample is difficult because of extreme peak width, but the data appear most consistent with those of the two-line ferrihydrite structure or the $Fe_3O_4$ magnetite structure, and are unlike those of an iron hydroxide phase. An additional peak was observed at very low angle.

Figure 4:
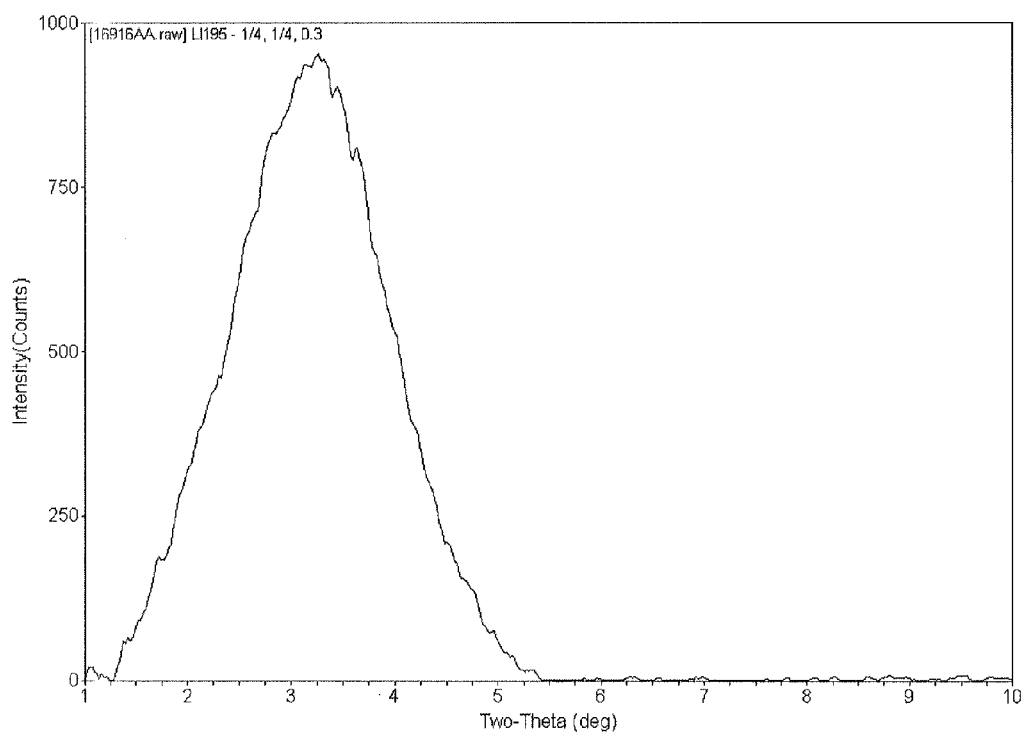
FIG. 4 is the low-angle powder X-ray diffraction spectrum after subtraction of direct beam scatter and background, for iron-containing nanoparticles made in inventive Example 3k.

A low angle XRD spectrum of the powder sample is shown in FIG. 4. Typically such sharp very low angle scattering peaks are observed for very mono-disperse particle size distributions of very small particles. To determine peak position and peak width, the direct beam scatter and background were subtracted from the raw data, followed by profile fitting of the low angle peak using a pseudo-Voight profile. The peak position is 3.16 degrees 2θ, corresponding to a spacing of 28 Å. The peak half-width, taken, for example, as the full width at half maximum (FWHM), is 1.80 degrees 2θ.

A summary of the results for the single jet additions of Example 3 is shown in Table 2 below:

TABLE 2

| Ex. | Reactant Addition Sequence | MAA/Fe Ratio | DLS Size (nm) | Comment |
|---|---|---|---|---|
| 3a | Fe/MAA/OH/H2O2 | 1.2 | Sediment | Comparative |
| 3b | Fe/MAA/OH/H2O2 | 1.8 | 28 | Inventive |
| 3c | Fe/MAA/OH/H2O2 | 2.4 | 12.5 | Inventive |
| 3d | Fe/MAA/OH/H2O2 | 2.4 | 11 | Inventive |
| 3e | MAA/OH/Fe/H2O2 | 2.6 | 6.9 | Inventive |
| 3f | MAA/OH/H2O2/Fe | 2.6 | 4.6 | Inventive |
| 3g | Fe/MAA/OH/H2O2 | 2.75 | 5.2 | Inventive |
| 3h | MAA/OH/Fe | 3.0 | 6.6 | Inventive |
| 3i | MAA/OH/Fe | 3.9 | 2.8 | Inventive |
| 3j | Fe/MAA/OH/H2O2 | 4.6 | 3.3 | Inventive |
| 3k | Fe/MAA/OH/H2O2 | 4.6 | 4.9 | Inventive |

Examination of the results shown in Table 2 above indicates that for all reactant addition sequences studied, use of a MAA to iron molar ratio equal to or greater than 1.8 results in a stable iron-containing nanoparticle dispersion free of any substantial amount of sediment and having with a particle size less than about 30 nm.

Example 4

Attempted Preparation of Copper, Cobalt and Nickel Nanoparticle Dispersion

The procedures of Example 3k were repeated except that the iron nitrate nonahydrate was replaced with an equimolar amount of each of the nitrate hydrate salts of copper, cobalt and nickel. No nanoparticles were observed to form with these metal ions. Thus the unexpected ability of the iron ion to form 2-5 nm diameter nanoparticles is clearly demonstrated.

Example 5

Preparation of Iron-Containing Nanoparticles with Alternate Carboxylic Acids

Example 5a: Single Jet Addition with Lactic Acid/Iron Ratio of 4.6 (Comparative)

The procedures of 3k were repeated except that the methoxyacetic acid was replaced with an equimolar amount of lactic acid. A yellow-green sediment formed.

Example 5b: Single Jet Addition with Tartaric Acid/Iron Ratio of 1.74 (Comparative)

The procedures of 3k were repeated except that the methoxyacetic acid was replaced with tartaric acid in a 1.74 molar ratio to iron. No nanoparticles were observed to form.

Example 5c: Single Jet Addition with Citric Acid/Iron Ratio of 2.32 (Comparative)

The procedures of 3k were repeated except that the methoxyacetic acid was replaced with citric acid in a 2.32 molar ratio to iron. A sediment of Ferric Ammonium Citrate appeared to form.

Example 5d: Single Jet Addition with Citric Acid/Iron Ratio of 0.87 (Inventive)

The procedures of 3k were repeated except that the methoxyacetic acid was replaced with citric acid in a 0.87 molar ratio to iron. A dispersion of 1.0 nm diameter size (DLS) nanoparticles was observed to form.

Example 5e: Single Jet Addition with Citric Acid/Iron Ratio of 0.58 (Inventive)

The procedures of 3k were repeated except that the methoxyacetic acid was replaced with citric acid in a 0.58 molar ratio to iron. A dispersion of 4.1 nm diameter size (DLS) nanoparticles was observed to form.

Example 5f: Single Jet Addition with Acetic Acid/Iron Ratio of 6.55 (Inventive)

The procedures of 3k were repeated except that the methoxyacetic acid was replaced with acetic acid in a 6.55 molar ratio to iron. A dispersion of 5.4 nm diameter size (DLS) nanoparticles was observed to form.

Example 5g: Single Jet Addition with MEEAA/Iron Ratio of 2.75 (Inventive)

The procedures of 3k were repeated except that the methoxyacetic acid was replaced with 2-[2-(2-methoxyethoxy)ethoxy]acetic acid (MEEAA) in a 2.75 molar ratio to iron. A dispersion of 4.9 nm diameter size (DLS) nanoparticles was observed to form.

Example 6

Use of Aqueous Iron Oxide Nanoparticle Dispersion to Reduce Light-off Temperature of Carbonaceous Material (Inventive)

Finely divided activated carbon (DARCO® 100 mesh supplied by Norit Americas Inc.) was imbibed with the iron oxide nanoparticle aqueous dispersion prepared in Example 3k, using an incipient wetness technique. The concentration of iron oxide in the dispersion was 3.5% by weight. The mixture of activated carbon and iron oxide nanoparticle aqueous dispersion was then vacuum dried at 80° C. for 3 days; the imbibing and drying steps resulted in carbon particles decorated with adsorbed iron oxide nanoparticles. A 100 mg sample of the decorated carbon material was then heated in a fixed bed reactor under a flowing gas stream (50 cc/min) containing 20% $O_2$ and 80% $N_2$. The gas at the output side was sampled and analyzed by Gas Chromatography, such that the CO and $CO_2$ output over time was integrated. The fixed bed reactor was linearly ramped at 10° C./minute from room temperature to 1000° C., during which temperature was monitored with a separate thermocouple wired to the outside of the quartz tube reactor. Shown in FIG. 6 is the result of detected $CO_2$ peak area as a function of temperature. The data plotted as diamonds corresponding to an activated carbon-only control, whereas the circles correspond to the results with the inventive iron oxide nanoparticles. Thus a dramatic lowering of the ignition "light-off" temperature by about 200° C. resulted from treatment with the iron oxide nanoparticle dispersion.

Example 7a

Extraction of Aqueous Iron Oxide Nanoparticle Dispersion to Organic Solvent Using Octanoic Acid Inventive An aliquot of 7.5 g of aqueous iron oxide nanoparticle dispersion prepared according to the process given in Example 3k, having a temperature of about 25° C., was added to a 40 ml vial. To that was added a 3.4 g solution composed of 1.3 g octanoic acid and 2.1 g Kensol® 50H, followed by 30 seconds of shaking. An emulsion formed, which subsequently separated in minutes to produce a dark upper phase above an orange colored aqueous remnant phase. After several hours the extraction was complete as indicated by a clear aqueous remnant phase.

Example 7b

Extraction of Aqueous Iron Oxide Nanoparticle Dispersion to Organic Solvent Using Octanoic Acid (DPF-12)

Inventive

An aliquot of 7.6 g of aqueous iron oxide nanoparticle dispersion prepared according to the process given in Example 3j, having a temperature of about 25° C., was added to a 40 ml vial. To that was added a 2.8 g solution composed of 2.0 g octanoic acid and 0.8 g Isopar-L®, followed by 30 seconds of shaking. An emulsion formed, which subsequently separated in minutes to produce a dark upper phase above an orange colored aqueous remnant phase. After several hours the extraction was complete and the upper phase was collected. Dynamic Light Scattering analysis of the upper organic phase revealed a number average mean particle size of 3.3 nm.

Example 7c

Extraction of Aqueous Iron Oxide Nanoparticle Dispersion with Added Triethanolamine to Organic Solvent Using Octanoic Acid (DPF-5)

Inventive

An aliquot of 7.0 ml of aqueous iron oxide nanoparticle dispersion prepared according to the process given in Example 3k and pH adjusted to 8.3 with triethanolamine, having a temperature of about 25° C., was added to a 40 ml vial. To that was added a 1.4 g solution composed of 0.3 g octanoic acid and 1.1 g Isopar-L®, followed by 30 seconds of shaking. An emulsion formed, which separated in minutes to produce a dark upper organic colloid phase above an orange colored aqueous remnant phase. After several hours the extraction was complete and the upper phase was collected. Dynamic Light Scattering analysis of the upper organic phase revealed a number average mean particle size of 4.2 nm.

Example 7d

Extraction of Aqueous Iron Oxide Nanoparticle Dispersion to Organic Solvent Using Octanoic Acid in the Presence of Sodium Hydroxide (DPF-1)

Inventive

An aliquot of 17.0 ml of aqueous iron oxide nanoparticle dispersion prepared according to the process given in Example 3j, having a temperature of about 25° C., was added to a 40 ml vial. To that was added a 5.5 g solution composed of 0.6 g octanoic acid, 4.4 g Isopar-L®, and 0.45 g of a 25% sodium hydroxide solution, followed by 30 seconds of shaking. An emulsion formed, which separated in minutes to produce a dark upper organic colloid phase above an orange colored aqueous remnant phase. After several hours the extraction was complete and the upper phase was collected. Dynamic Light Scattering analysis of the upper organic phase revealed a number average mean particle size of 4.3 nm.

Example 7e

Extraction of Aqueous Iron Oxide Nanoparticle Dispersion to Organic Solvent Using Octanoic Acid in the Presence of Ammonium Hydroxide (DPF-3)

Inventive

An aliquot of 17.0 ml of aqueous iron oxide nanoparticle dispersion prepared according to the process given in Example 3j, having a temperature of about 25° C., was added to a 40 ml vial. To that was added an 8.7 g solution composed of 0.6 g octanoic acid, 4.4 g Isopar-L®, and 3.7 g of a 3.3 M ammonium hydroxide solution, followed by 30 seconds of shaking. An emulsion formed, which separated in minutes to produce a dark upper organic colloid phase above an orange colored aqueous remnant phase. After several hours the extraction was complete and the upper phase was collected. Dynamic Light Scattering analysis of the upper organic phase revealed a number average mean particle size of 6.5 nm.

Example 8a

Extraction of Aqueous Iron Oxide Nanoparticle Dispersion to Organic Solvent Using Octanoic Acid in the Presence of Octylamine Inventive An aliquot of 17.6 ml of aqueous iron oxide nanoparticle dispersion prepared according to the process given in Example 3j, having a temperature of about 25° C., was added to a 40 ml vial. To that was added a 5.8 g solution composed of 0.6 g octanoic acid, 4.4 g Isopar®, and 0.8 g octylamine, followed by 30 seconds of shaking. An emulsion formed, which separated in minutes to produce a dark upper organic colloid phase above an orange colored aqueous remnant phase. Over several minutes a very low volume third phase, having an intermediate specific gravity, could also be observed at the interface between the aqueous and organic phases. After about 30 minutes the extraction was complete and the upper phase was collected.

Dynamic Light Scattering analysis of the upper organic phase revealed a number average mean particle size of 3.0 nm, which was similar to that measured for the aqueous product of Example 3j. The concentration of iron oxide in the product organic colloidal nanoparticle dispersion was 8.7%. Stability studies of the organic colloidal nanoparticle dispersion were carried out at an ambient temperature of about 20° C. and at 60° C. After 1 month, the organic colloidal nanoparticle dispersion remained non-turbid and free of settled precipitates at both temperatures.

Example 8b

Extraction of Aqueous Iron Oxide Nanoparticle Dispersion to Organic Solvent Using Octanoic Acid in the Presence of Octylamine (DPF-11)

Inventive

An aliquot of 17.0 ml of aqueous iron oxide nanoparticle dispersion prepared according to the process given in Example 3j, having a temperature of about 25° C., was added to a 40 ml vial. To that was added a 5.8 g solution composed of 0.3 g octanoic acid, 4.7 g Isopar-L®, and 0.8 g of octylamine, followed by 30 seconds of shaking. An emulsion formed, which separated in minutes to produce a dark upper organic colloid phase above an orange colored aqueous remnant phase. After several hours the extraction was complete and the upper phase was collected. Dynamic Light Scattering analysis of the upper organic phase revealed a number average mean particle size of 3.5 nm.

Example 8c

Extraction of Aqueous Iron Oxide Nanoparticle Dispersion to Organic Solvent Using Octanoic Acid in the Presence of tert-Octylamine (DPF-6)

Inventive

An aliquot of 14.0 ml of aqueous iron oxide nanoparticle dispersion prepared according to the process given in Example 3k, having a temperature of about 25° C., was added to a 40 ml vial. To that was added a 2.9 g solution composed of 0.3 g octanoic acid, 2.3 g Isopar-L®, and 0.3 g of tert-octylamine, followed by 30 seconds of shaking. An emulsion formed, which separated in minutes to produce a dark upper organic colloid phase above an orange colored aqueous remnant phase. After several hours the extraction was complete and the upper phase was collected. Dynamic Light Scattering analysis of the upper organic phase revealed a number average mean particle size of 3.8 nm.

Example 8d

Extraction of Aqueous Iron Oxide Nanoparticle Dispersion to Organic Solvent Using 2-Ethylhexanoic Acid in the Presence of Octylamine (DPF-2)

Inventive

An aliquot of 17.0 ml of aqueous iron oxide nanoparticle dispersion prepared according to the process given in Example 3j, having a temperature of about 25° C., was added to a 40 ml vial. To that was added a 6.2 g solution composed of 0.6 g 2-ethylhexanoic acid, 4.4 g Isopar-L®, and 1.2 g of octylamine, followed by 30 seconds of shaking. An emulsion formed, which separated in minutes to produce a dark upper organic colloid phase above an orange colored aqueous remnant phase. After several hours the extraction was complete and the upper phase was collected. Dynamic Light Scattering analysis of the upper organic phase revealed a number average mean particle size of 3.8 nm.

Example 9

Extraction of Aqueous Iron Oxide Nanoparticle Dispersion to Organic Solvent Using Oleic Acid in the Presence of Octylamine Inventive An aliquot of 17.6 ml of aqueous colloid of iron oxide prepared according to the process given in Example 3j, having a temperature of about 25° C., was added to a 40 ml vial. To that was added a 5.8 g solution composed of 0.6 g oleic acid, 4.4 g Isopar®, and 0.8 g octylamine, followed by 30 seconds of shaking. An emulsion formed, which separated in minutes to produce a dark upper organic colloid phase above an orange colored aqueous remnant phase. After about 30 minutes the extraction was complete and the upper phase was collected.

Dynamic Light Scattering analysis of the upper organic phase revealed a number average mean particle size of 2.9 nm, which was similar to that measured for the aqueous product of Example 3j. The concentration of iron oxide in the product organic colloidal nanoparticle dispersion was 8.2%. Stability studies of the organic colloidal nanoparticle dispersion were carried out at an ambient temperature of about 20° C. and at 60° C. After 1 month, the organic colloidal nanoparticle dispersion remained non-turbid and free of settled precipitates at both temperatures.

Example 10: Preparation of Fuel Additive Concentrate

The extraction procedure of Example 9 was repeated except that the Isopar® was replaced with an equal weight of Kensol® 50H. A portion of the extracted dispersion was combined with a 1:2 by volume mixture of oleic acid and kerosene diluent, such that a stable dispersion containing about 6.2% by weight of the iron-containing nanoparticles was produced.

Example 11: Preparation of Additized Diesel Fuel

Additized Ultra Low Sulfur Diesel fuel containing about 2.5 parts per million (ppm) by weight and 5 ppm by weight of the iron-containing nanoparticles were prepared by adding 1 part of the fuel additive concentrate prepared in Example 10 to about 24800 parts of Diesel fuel and to about 12400 parts Diesel fuel, respectively.

Example 12: Diesel Engine Evaluation of Additized Diesel Fuel

The additized Diesel fuels prepared as described in Example 11 was evaluated in an Isuzu Model BV-4LE24-cycle, water cooled, direct injection diesel engine used to power a Multiquip DCA25SSI Electric Generator operated under 10 kVA and 20 kVA loads. Total unburned hydrocarbons (HC) and particulate matter (PM) emissions were monitored using a Clean Air Technologies, International (Buffalo, N.Y., USA) portable emission measurement system (PEMS) equipped with a LASER light scattering PM Analyzer and a Total HC Analyzer based on the non-dispersive infrared (NDIR) principle.

Relative to an unadditized Diesel fuel control, additized fuel dosed at the 2.5 ppm by weight level resulted in more than a 20% reduction in Total HC at both the 10 kVA and 20 kVA loads, along with an 8% reduction in PM at the 20 kVA load. Dosing at the 5 ppm by weight level produced substantially similar results.

The invention has been described in detail, with particular reference to certain embodiments thereof, but it will be understood that variations and modifications can be effected within the spirit and scope of the invention as described above, by a person of ordinary skill in the art, without departing from the scope of the invention. Accordingly, it is intended that the invention not be limited to the described embodiments, but will have full scope defined by the claims.

What is claimed is:

1. A process for preparing a dispersion, comprising:
   (a) forming an aqueous dispersion comprising iron-containing nanoparticles adjusted to a pH in the range of 4 to 5;
   (b) adding and mixing to the aqueous dispersion of step (a), an immiscible carboxylic acid and a non-polar solvent to form an emulsion;
   (c) allowing the Immiscible non-polar phase to separate from a remnant aqueous phase; and,
   (d) physically separating the non-polar phase comprising a dispersion of iron-containing nanoparticles from the remnant aqueous phase.

2. The process of claim 1, wherein said aqueous dispersion comprising iron-containing nanoparticles is adjusted to a pH in the range of 4.2 to 4.8.

3. The process of claim 1, wherein the pH is adjusted by the addition of an alkaline material.

4. The process of claim 3, wherein said alkaline material is an organic amine.

5. The process of claim 4, wherein said organic amine is octylamine.

6. The process of claim 1, wherein said immiscible carboxylic acid is comprised of 6 or more carbon atoms.

7. The process of claim 1, wherein said immiscible carboxylic acid is octanoic acid or oleic acid.

8. The process of claim 1, wherein said non-polar phase comprising a dispersion of iron-containing nanoparticles provides an ignition temperature for carbonaceous soot of less than 200° C. when burned as part of a fuel in a diesel engine.

* * * * *